United States Patent [19]

Smith

[11] 4,013,297
[45] Mar. 22, 1977

[54] STATIC SEAL WITH AN OPEN ROTATIONAL MODE

[75] Inventor: Robert L. Smith, Louisville, Ky.

[73] Assignee: Chemetron Corporation, Chicago, Ill.

[22] Filed: Oct. 8, 1975

[21] Appl. No.: 620,682

[52] U.S. Cl. .................................. 277/3; 277/27
[51] Int. Cl.² ........................................ F16J 15/48
[58] Field of Search .......... 277/3, 27, 61, 74, 93 R, 277/96

[56] References Cited

UNITED STATES PATENTS

| | | | |
|---|---|---|---|
| 2,710,205 | 6/1955 | Brkich | 277/3 |
| 2,768,011 | 10/1950 | Mosher | 277/96 X |
| 3,499,653 | 3/1970 | Gardner | 277/61 X |
| 3,511,510 | 5/1970 | Lindeboom | 277/74 X |
| 3,572,727 | 3/1971 | Greiner | 277/74 |

FOREIGN PATENTS OR APPLICATIONS

| | | | |
|---|---|---|---|
| 1,162,103 | 8/1969 | United Kingdom | 277/61 |

Primary Examiner—Robert I. Smith
Attorney, Agent, or Firm—N. M. Esser

[57] ABSTRACT

A seal is disclosed for a shaft journalled to rotate within a sleeve. The seal comprises annular members mounted between the shaft and the sleeve for relative movement along an axis common to the shaft and the sleeve. The members are biased into sealing engagement with each other and are separable by fluid pressure for relative rotation of the shaft and the sleeve with no surface-to-surface wear of the seal.

5 Claims, 2 Drawing Figures

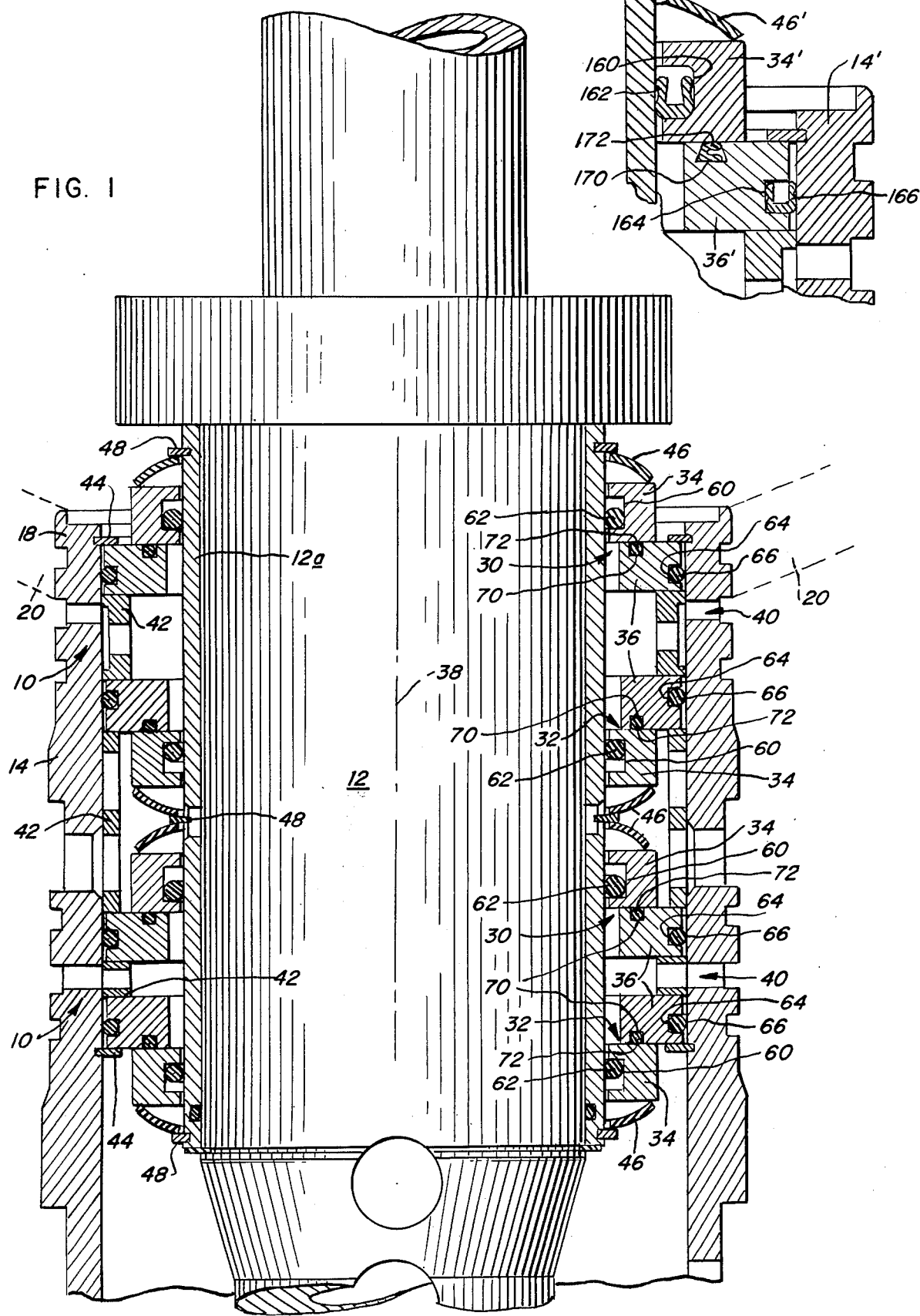

STATIC SEAL WITH AN OPEN ROTATIONAL MODE

BACKGROUND OF THE INVENTION

This invention pertains generally to rotary seals and particularly to a seal adapted to provide a surface-to-surface seal between a shaft and a sleeve under static conditions yet allow relative rotation of the shaft and the sleeve with no surface-to-surface wear of the seal.

An important exemplary need for such seals is found in centrifugal filters as exemplified in U.S. Pat. No. 3,662,894. In such filters, as shown and described in said patent, a shaft carring a number of filter plates is stationary under static conditions, while a suspension of a liquid and often abrasive solids are being filtered through the plates. At selected times, but after the liquid has been drained under conventional practice, the shaft is rotated, often at high rotational speed, to throw accumulated solids radially outwardly from the plates by centrifugal force, thereby to clean the plates and allow the solids to be removed from the filter.

In such filters, particularly when the solids have been abrasive, rotary seals at the shafts have worn rapidly and eccessively, so as to allow consequent leakage of the materials being filtered. In prior designs, synthetic rubber lip seals or polytetrafluoroethylene-coated springloaded sealing rings, which have a generally U-shaped cross-section, were employed with only partially successful results.

Air pressure has been applied in an effort to flex such spring-load sealing rings to eliminate frictional wear of the seals as the shaft, against which such seals bear under static conditions, is rotated. These practices have proved partially successful, insofar as such seals have exhibited relatively longer useful lives; nonetheless, rapid uneven frictional wear of the seals and consequent leakage of the materials being filtered have often occured. Consequently, such filters have not often, if ever, been used in nuclear waste recovery applications and other applications were essentially no leakage can be tolerated.

SUMMARY OF THE INVENTION

Therefore, one object of this invention is to provide a seal for a shaft journalled to rotate within a sleeve, wherein a surface-to-surface seal is provided under static conditions and relative rotation of the shaft and the sleeve can occur with essentially no surface-to-surface wear of the seal. Another object of this invention is to provide a seal having particular, but not exclusive, utility in centrifugal filters as discussed above.

These objects may be attained in a seal comprising a pair of annular members mounted between the shaft and the sleeve. The members are biased axially together and are separable by fluid pressure whereby relative rotation of the shaft and the sleeve can occur with essentially no surface-to-surface wear of the seal.

When fluid pressure is axially applied to one side of the members, the members are separated axially to allow relative rotation of the shaft and the sleeve as aforesaid.

Preferably, a plural pair of opposed seals of similar form are provided at opposite ends of respective portions of the the shaft.

These objects and other objects, features, and advantages of this invention are evident from the following detailed description of a preferred embodiment of this invention with the aid of the accompanying drawings.

BRIEF DESCRIPTION OF THE DRAWINGS

In the drawings:

FIG. 1 is a partially fragmentary axial sectional view of an arrangement of paired seals embodying this invention, as associated with a shaft journalled to rotate within a sleeve, as in such a centrifugal filter; and FIG. 2 is an enlarged detail, which is taken from FIG. 1 but modified to show another form of sealing rings useful in the arrangement of FIG. 1, the primed reference numerals being applied to certain features similar in form and function to the features similarly numbered in FIG. 1.

DETAILED DESCRIPTION OF PREFERRED EMBODIMENT

In FIG. 1, a pair of similar seals 10, which respectively constitute preferred embodiments of this invention, are associated with adjacent portions of a shaft 12 journalled to rotate within a sleeve 14, by conventional bearings (not shown) adjacent each end of the shaft 12. Such arrangement has particular utility in centrifugal filters as shown and described in U.S. Pat. No. 3,662,894.

For such utility, the shaft 12 which as shown is a composite of plural elements including a sleeve 12a considered for present purposes to be a part of the shaft 12, is intended to be rotated, often at a high rotational speed, at selected times by a suitable prime mover (not shown), and the sleeve 14 is intended to be integrally attached, at its uppermost end portion 18, to a lower sump portion 20 of a vessel, which is shown framentarily in phantom lines. The vessel is designed to contain a liquid, which essentially must not be permitted to leak through the seals 10 under static conditions. Under conventional practice, the liquid will have been drained from the vessel before the shaft 12 is rotated.

Each seal 10 comprises opposed pairs 30 and 32 of annular members 34 and 36 mounted between the shaft 12 and the sleeve 14 for relative movement along an axis common to the members 34 and 36, the shaft 12, and the sleeve, namely, their common central axis indicated at 38. Minor differences in relative proportions of the seals 10, as shown in FIG. 1, are insignificant relative to this invention.

In each pair 30 and 32, the members 34 and 36 are biased toward and (through sealing rings to be described) against each other and are separable by fluid pressure axially applied to one side of the members 34 and 36 whereby relation rotation of the shaft 12 and the sleeve 14 can occur with essentially no surface-to-surface wear of the seal 10. An inlet 40 is provided in the sleeve 14 between each pair 30 and 32 of annular members 30 and 32 of each seal 10. Fluid pressure, preferably air pressure axially against one side of the members 34 and 36 of each pair 30 and 32 from suitable sources (not shown) may be applied through the inlets 40 to separate members 34 and 36 along the axis 33 whereby relative rotation of the shaft 12 and the sleeve 14 can occur with essentially no surface-to-surface wear of the seals 10.

The members 34 and 36 have rectangular cross-sections except for circumferential grooves to be described. In each pair 30 and 32, the members 36, which have larger inner and outer diameters, are located between the members 34, which have smaller inner and outer diameters. Furthermore, the members 36 are spaced by annular spacers 42 and fixed against axial movement by respective annular retaining rings 44 disposed in circumferential grooves 46 in the sleeve 14.

The members 34 are fitted over the shaft 12 with a conventional sliding fit allowing axial movement of the members 34 along the shaft 12 and thus along the axis 38. In each pair 30 and 32, annular springs 46, which are axially compressed between the members 34 and respective annular retaining rings 48 disposed in circumferential grooves 50 in the shaft 12, urge the members 34 axially toward and (through sealing rings to be described) against the respectively paired members 36 yet allow axial separation of the members 34 and the members 36 when fluid pressure, preferably air pressure, is applied through the inlets 40 and thus axially against one side of the members 34 and 36. Because of the clearances between the members 36 and the shaft 12 the members 34 are thus moved axially so as to separate the members 34 and 36.

The members have circumferential grooves 60, which open radially toward the shaft 12 and may contain conventional resilient O-rings 62 resiliently engaged with the shaft 12, as shown in FIG. 1, to maintain the members 34 and the shaft 12 in a liquid-tight sealed relation to each other. As shown in FIG. 1, the members 36 have circumferential grooves 64, which open radially toward the sleeve 14 and respectively may contain conventional resilient O-rings 66 resiliently engaged with the sleeve 14 to maintain the members 36 and the sleeve in a liquid-tight sealed relation to each other. When such O-rings are used, the grooves 60 are somewhat wider axially than the (nominal) diameter of the O-rings 62, as shown in FIG. 1, so as to allow some relative axial displacement of the members 34 and the O-rings 62 with axial movement of the members 34. Alternatively, and preferably for some applications, polytetrafluoroethylene-coated spring-loaded sealing rings 162 and 166, which (as described above) have a generally U-shaped cross-section and are available commercially from Aeroquip Corporation under its trademark "Omniseal", may be disposed in suitably diversioned circumferential grooves 160 and 164 for similar purposes, as shown in FIG. 2.

In each pair 30 and 32, the members 36 have circumferential grooves 70 opening axially toward the respectively paired members 34. As shown in FIG. 1, the grooves 70 may contain conventional resilient O-rings 72 resiliently engageable with the respectively paired members 34 so as to place the members 34 and 36 are in a liquid-tight sealing relation with each other except when fluid pressure is applied at the inlets 40. Alternatively, and preferably for some applications, polytetrafluoroethylene-coated spring-loaded rings 172, which are similar to the rings 62' and 64', may be disposed in suitably dimensioned circumferential grooves 170 for similar purposes, as shown in FIG. 2.

Accordingly, a surface-to-surface seal is provided by each seal 10 under static conditions. Furthermore, when fluid pressure is applied through the inlets 40, relative rotation of the shaft 12 and the sleeve 14 can occur with, essentially no surface-to-surface wear of the seals 10.

I claim:

1. For a shaft journalled to rotate at intermittent times within a sleeve, a seal comprising:
   a. a shaft, said shaft adapted to be connected to a motive source for intermittent rotation;
   b. a sleeve surrounding said shaft, said sleeve having a radial opening therein adapted to be connected to a source of fluid pressure;
   c. a first annular member surrounding said shaft and fixedly attached to said sleeve;
   d. a second annular member surrounding said shaft, and mounted thereon for axial movement along said shaft, said second annular member and said first annular member overlapping each other to form an annular area of engagement therebetween and an area of nonengagement adjacent said shaft;
   e. resilient sealing means located between said area of engagement;
   f. means located on the side of said second member opposite said sleeve opening for biasing said second member toward said first member to form a seal at said area of engagement when said shaft is not rotating and no fluid pressure is applied to said sleeve opening, and upon applying fluid pressure to said sleeve opening the pressure acting on said area of non-engagement to move said second member axially to open said area of sealing engagement to fluid flow therethrough prior to and during rotation of said shaft.

2. The seal of claim 1 further comprising sealing means located between said shaft and said second annular member.

3. The seal of claim 2 in which said resilient sealing means at said area of engagement and said sealing means between said shaft and said second annular member are spring loaded seals having a coating of polytetrafluoroethylene.

4. The seal of claim 3 further comprising an annular spacer located in said sleeve adjacent said first annular member and having an aperture in communication with said sleeve opening for the application of fluid pressure between said spacer and shaft, a second pair of annular members similar to said first and second annular members but opposedly mounted in said sleeve adjacent said spacer, and second biasing means to bias said second pair of members together to seal in a direction opposite that of said first and second annular members.

5. The seal of claim 4 further comprising a radial port in said sleeve adjacent said second pair of annular members for fluid flow therefrom upon the application of fluid pressure to said sleeve opening.

* * * * *

UNITED STATES PATENT AND TRADEMARK OFFICE
CERTIFICATE OF CORRECTION

PATENT NO. : 4,013,297
DATED : March 22, 1977
INVENTOR(S) : Robert L. Smith

It is certified that error appears in the above-identified patent and that said Letters Patent are hereby corrected as shown below:

Column 4, line 44, delete "3" and insert -- 2 --.

*Signed and Sealed this*

Twenty-fourth *Day of* May 1977

[SEAL]

*Attest:*

RUTH C. MASON
*Attesting Officer*

C. MARSHALL DANN
*Commissioner of Patents and Trademarks*